United States Patent
Yu et al.

(10) Patent No.: US 10,670,163 B1
(45) Date of Patent: Jun. 2, 2020

(54) ELECTRICALLY-CONTROLLED LARGE-CAPACITY PROPORTIONAL VALVE

(71) Applicant: TAIWAN CHELIC CO., LTD., New Taipei (TW)

(72) Inventors: Ping-Cheng Yu, New Taipei (TW); Chih-Sheng Cheng, New Taipei (TW)

(73) Assignee: TAIWAN CHELIC CO., LTD., New Taipei (TW)

( * ) Notice: Subject to any disclaimer, the term of this patent is extended or adjusted under 35 U.S.C. 154(b) by 0 days.

(21) Appl. No.: 16/281,069

(22) Filed: Feb. 20, 2019

(30) Foreign Application Priority Data

Jan. 10, 2019 (TW) .............................. 108100925 A

(51) Int. Cl.
*F16K 31/02* (2006.01)
*G05D 7/06* (2006.01)
*F16K 31/365* (2006.01)
*F16K 31/42* (2006.01)

(52) U.S. Cl.
CPC ............ *F16K 31/02* (2013.01); *F16K 31/365* (2013.01); *F16K 31/42* (2013.01); *G05D 7/0629* (2013.01); *G05D 7/0676* (2013.01)

(58) Field of Classification Search
CPC ........ F16K 31/02; F16K 31/42; F16K 31/365; G05D 7/0676; G05D 7/0629
USPC ............. 137/487.5, 489.5, 596.16, 487, 488; 251/30.03, 129.17
See application file for complete search history.

(56) References Cited

U.S. PATENT DOCUMENTS

| 4,961,441 | A | * | 10/1990 | Salter | ................. G05D 16/2053 137/14 |
| 5,042,775 | A | * | 8/1991 | Willemsen | ............. F16K 31/402 222/14 |
| 5,348,036 | A | * | 9/1994 | Oksanen | ................... G05D 7/03 137/1 |
| 5,586,575 | A | * | 12/1996 | Bergamini | .......... F15B 13/0438 137/488 |
| 5,887,847 | A | * | 3/1999 | Holborow | ............. F16K 31/128 251/33 |
| 6,244,561 | B1 | * | 6/2001 | Hansen, III | ............. F16K 31/42 251/121 |
| 6,305,401 | B1 | * | 10/2001 | Uehara | .............. G05D 16/2095 137/102 |
| 6,338,358 | B1 | * | 1/2002 | Watanabe | .......... G05D 16/2093 137/102 |

(Continued)

*Primary Examiner* — Minh Q Le
(74) *Attorney, Agent, or Firm* — Leong C. Lei

(57) ABSTRACT

An electrically-controlled large-capacity proportional valve includes, in the inside thereof, a depressurization chamber, which is connected to a guide hole channel, a sensor channel, and a discharge channel. The depressurization chamber is provided therein with a main diaphragm having a reversal prevention valve for driving a primary shaft and a secondary shaft to move. Through detection conducted in the sensor channel, when a pressure is low, the main diaphragm drives downward the primary shaft to push the secondary shaft, so that the secondary shaft causes a valve gate opening to carry out adjustment through two stages of displacement for controlling fluid flow rate after opening of the valve gate opening. At this moment, the primary-side pressure enters an output port of a valve seat the outlet port to increase a secondary-side pressure so as to accurately regulate an output of the secondary-side pressure.

4 Claims, 8 Drawing Sheets

(56) References Cited

U.S. PATENT DOCUMENTS

| | | | | |
|---|---|---|---|---|
| 6,557,820 B2* | 5/2003 | Wetzel | ............ | F15C 5/00 |
| | | | | 137/596.16 |
| 6,779,541 B2* | 8/2004 | Inayama | ............ | G05D 16/2095 |
| | | | | 137/102 |
| 7,533,690 B2* | 5/2009 | Reinicke | ............ | F16K 15/183 |
| | | | | 137/487.5 |
| 10,409,298 B2* | 9/2019 | Ponzo | ............ | G05D 16/2013 |
| 2002/0036013 A1* | 3/2002 | Inayama | ............ | G05D 16/2024 |
| | | | | 137/487.5 |
| 2002/0117214 A1* | 8/2002 | Tucker | ............ | G05D 16/2053 |
| | | | | 137/487.5 |
| 2012/0204974 A1* | 8/2012 | Sakasegawa | ............ | G01F 5/00 |
| | | | | 137/486 |

* cited by examiner

ELECTRICALLY-CONTROLLED LARGE-CAPACITY PROPORTIONAL VALVE

(a) TECHNICAL FIELD OF THE INVENTION

An electrically-controlled large-capacity proportional valve, which has a valve base in which a depressurization chamber is formed by a main diaphragm that includes a reversal prevention valve and a valve gate opening that is formed by a primary shaft and a secondary shaft that are driven to move by the main diaphragm, so that by means of a guide hole channel and opening an ingress electromagnetic valve, a primary-side pressure in introduced into the depressurization chamber to increase a pressure above the main diaphragm for carrying out a first stage of downward movement, and by means of an egress electromagnetic valve in combination with adjustment of a secondary-side pressure to carry out control of depressurization, the primary shaft, the secondary shaft, and the valve gate opening may achieve accurate adjustment of an output amount of the secondary-side pressure, when a large amount of discharge is required, a top end of the primary shaft completely enters the discharge chamber so that due to an annular area of a surface area of the discharge chamber minus a surface area of the primary shaft being equal to a surface area of the valve gate opening, the gas flow hole helps speed up an output of a large amount of the secondary-side pressure through the valve base to the outside so as to achieve the purpose of speeding up stabilization of the secondary-side pressure.

(b) DESCRIPTION OF THE PRIOR ART

Electrically-controlled proportional valves have been widely used in various industries. The driving power provided by pneumatic fluid may vary with the pneumatic pressure thereof in respect of stability and output pressure. Thus, to have output pressure stabilized and controllable by an electrical control system, the techniques of using the conventional electrically-controlled proportional valve to the pressure of pneumatic fluid have been widely adopted to achieve control of the pneumatic fluid used and thereby providing stable and controlled pressure.

The conventional electrically-controlled proportional valve is often provided therein with a depressurization chamber, a straight rod, and a diaphragm and the operation thereof is such that fluid after input through an inlet port, flows through an internal flow passage to the diaphragm to drive the straight rod to displace downward, allowing the fluid inside the electrically-controlled proportional valve to pass through a valve gate opening to flow an outlet port so as carry out adjustment. However, the diaphragm and the straight rod are arranged inside the depressurization chamber, and for easy adjustment, the depressurization chamber is structured to have space having a height that is at least slightly greater than a movement stroke of the diaphragm in order to achieve a smooth process of displacement of the straight rod for pushing.

Due to a pressure difference of the diaphragm and the depressurization chamber, an acting force is acting on the straight rod so as to have the input flow pressure keeping a predetermined output flow rate, whereby the input fluid pressure does not allow for applications requiring accurate pressure regulation. Further, for applications where an even larger capacity is required for the electrically-controlled proportional valve, the structural design is extremely complicated so that in order to exploit the best use of the input fluid in a large capacity structure of an electrically-controlled proportional valve, a structure that is capable of pressure adjustment within a range of working pressure and also features accurate adjustment is desired.

SUMMARY OF THE INVENTION

The present invention relates to an electrically-controlled large-capacity proportional valve, of which the primary technical purpose is that a main diaphragm that comprises a reversal prevention valve is provided inside a valve base to form a depressurization chamber, so that an externally supplied primary-side pressure, when flowing by way of a guide hole channel through opening of an ingress electromagnetic valve into the depressurization chamber to drive the main diaphragm, pushes the primary shaft and the secondary shaft to displace for operation, thereby selectively opening or closing a valve gate opening to control an output amount of a secondary-side pressure.

When the primary-side pressure is so input as to increase the secondary-side pressure, in case of excessively high pressure so that an even larger flow rate is needed for discharging, an egress electromagnetic valve of the depressurization chamber is operated for fast discharging to reduce a pressure acting on the main diaphragm to allow the primary shaft and the secondary shaft to both drive by an elastic member upward for position returning, causing a complete entry of a top end of the primary shaft into a discharge chamber, wherein due to an annular area of a surface area of the discharge chamber minus a surface area of the primary shaft being equal to a surface area of the valve gate opening, increase of output of a large amount of pressure to the outside of a valve base could be achieved by way of a gas flow hole, whereby such a structural arrangement for two stages of discharge by means of the primary shaft and two stage of intake by means of the secondary shaft makes operations of pressure regulation or pressure adjustment carried out in a more accurate and more stable manner.

The present invention provides an electrically-controlled large-capacity proportional valve, in which a valve base that is formed with a flow passage is provided, on a top side thereof, with an ingress electromagnetic valve, an egress electromagnetic valve, and a sensor, wherein the flow passage is provided with an inlet port for ingress of a primary-side pressure and an outlet port for egress of a secondary-side pressure; the valve base is provided therein with a main diaphragm, which is arranged in a manner of being clamped and fixed and is provided with a reversal prevention valve, to form a depressurization chamber, wherein the depressurization chamber is connected with a guide hole channel that is provided with and controllable by the ingress electromagnetic valve for connection and communication with the inlet port, a discharge channel that is provided with and controllable by the egress electromagnetic valve for connection and communication with the outlet port, and the sensor conducting detection in a sensor channel connected to and in communication with the outlet port. A primary shaft that is formed with a gas passage hole is arranged in a discharge chamber of a central valve and a secondary shaft that is provided with an elastic element is provided on an underside of the primary shaft. The main diaphragm is in abutting engagement with the primary shaft to drive and move the secondary shaft, such that the secondary shaft is operable in combination with a spring force of the elastic member to selectively create a valve gate opening. When a pressure in the outlet port is low, the main diaphragm pushes downward the primary shaft to push the secondary shaft, and the secondary shaft controls the valve gate opening to carry out two stages of adjustment of movement distance for controlling flow rate generated after the opening of the valve gate opening, and at this moment, the primary-side pressure gets into the outlet port of the valve base to increase the secondary-side pressure; and when the pressure is high, the egress electromagnetic valve uses the reversal prevention valve the adjust control of reduction of the secondary-side pressure so that the valve gate opening may achieve accurate regulation or adjustment of an output amount of the secondary-side pressure. When it is desired to conduct discharge with a large amount, a top end of the primary shaft is brought completely into the discharge chamber and due an annular area of a surface area of the discharge chamber minus a surface area of the primary shaft being equal to a surface area of the valve gate opening, the structural feature that the discharge hole has an enlarged size helps speed up output of a large amount pressure straightly toward the outside of the valve base thereby achieving the purpose of speeding up stabilization of output of the secondary-side pressure.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
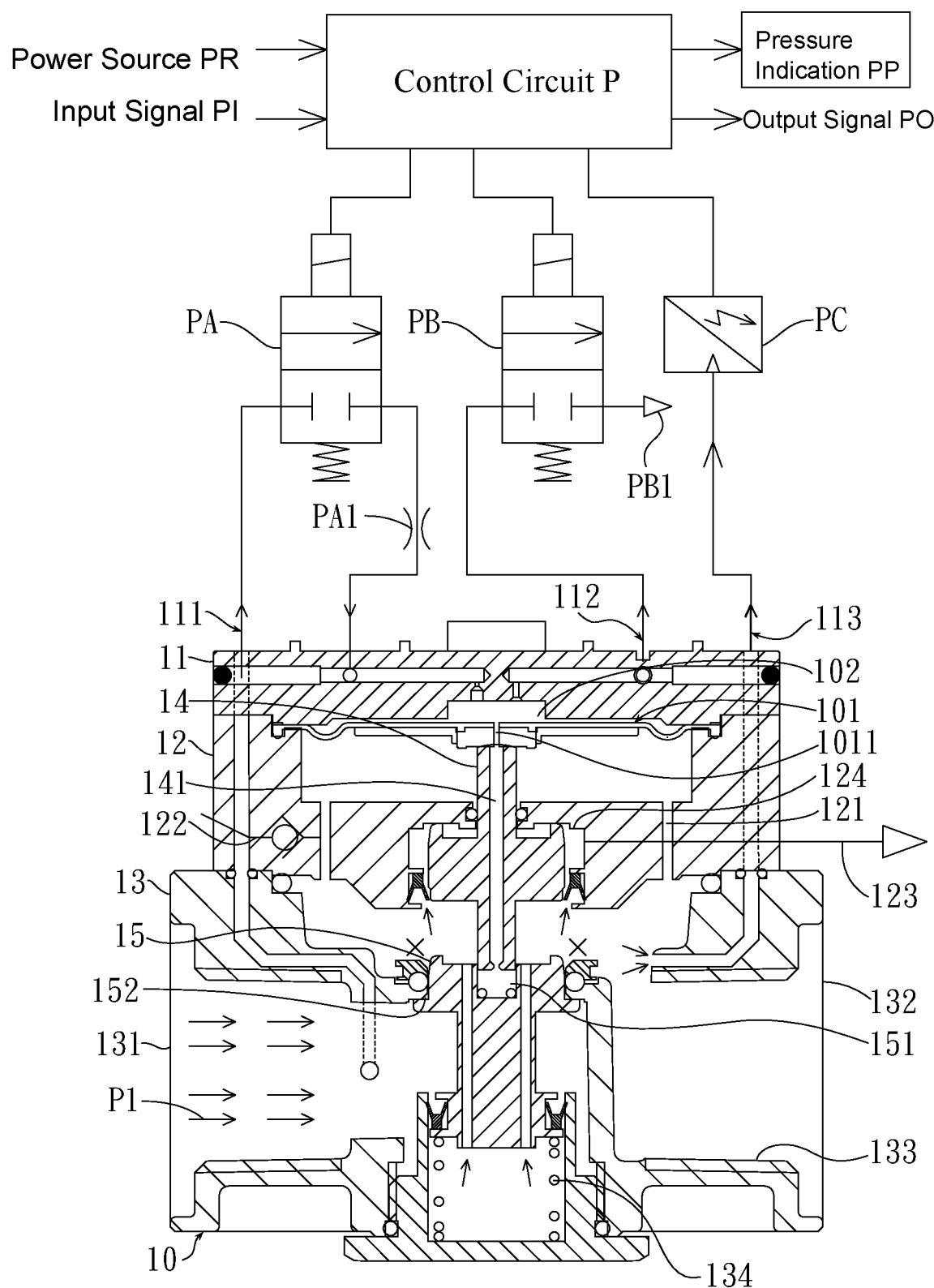
FIG. 1 is a schematic view showing a structure of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

A detailed description will be provided, by way of illustration, below to explain a preferred embodiment according to the present invention with reference to the attached drawings of FIGS. 1-8, for better understanding of the present invention.

The present invention provides an electrically-controlled large-capacity proportional valve, which has a structure that comprises: a valve base (10), to which a top valve (11), a central valve (12), and a valve seat (13) that are arranged in sequence from top to bottom are coupled. The valve base (10) comprises an inlet port (131) for input of a primary-side pressure (P1) and an outlet port (132) for output of a secondary-side pressure (P2). The inlet port (131) is connected by a flow passage (133) to the outlet port (132) for communication therebetween. A depressurization chamber (102), which is provided therein with a main diaphragm (101) that includes a reversal prevention valve (1011), is formed between the top valve (11) and the central valve (12). A size or volume of an internal space of the depressurization chamber (102), such as a circular hole area and a circular hole height, can be reduced to a minimum, so that the main diaphragm (101) may quickly balance a pressure inside the depressurization chamber (102). Speaking in a more specific way, this is related to faster adjustment of a balance pressure (PT), and this, when used in combination with proper restriction of ingress flow rate of the primary-side pressure (P1) through a throttle port (PA1), while keeping an effect of increasing pressure at a steady rate, would further shorten an opening time of an ingress electromagnetic valve (PA) and make control of a displacement stroke of the main diaphragm (101) more easily.

The depressurization chamber (102) is provided, through connection, with a guide hole channel (111) that comprises the ingress electromagnetic valve (PA) to control connection thereof to the inlet port (131), a discharge channel (112) that discharge an extra pressure by means of an egress electromagnetic valve (PB), and a sensor (PC) that carries out detection in a sensor channel (113) connected to the outlet port (132). The central valve (12) is provided therein with a flow stabilization hole (121) connected to and in communication with the valve seat (13), a central valve reversal prevention valve (122) connected from the flow stabilization hole (121) to the guide hole channel (111), and a gas flow hole (123) in communication with the outside.

Further, a primary shaft (14) that comprises a gas passage hole (141) formed therein is disposed in a discharge chamber (124) formed in the central valve (12). A secondary shaft (15) that is provided with an elastic member (134) is disposed on an underside of the primary shaft (14). The main diaphragm (101) pushes the primary shaft (14), so as to cause movement that drives the secondary shaft (15), which operates in combination with a spring force of the elastic member (134) to create a valve gate opening (152), wherein when a pressure in the outlet port (132) is excessively low, the main diaphragm (101) pushes the primary shaft (50) and the secondary shaft (15) downward, and the secondary shaft (15) performs a two stage intake adjustment, while the egress electromagnetic valve (PA) regulate an output amount of the secondary-side pressure (P2) by means of the reversal prevention valve (1011), and when performance is required for a large amount of discharge, a top end of the primary shaft (14) completely moves into the discharge chamber (124), and since an annular area that is a surface area of the discharge chamber (124) minus a surface area of the primary shaft (14) equals to a surface area of the valve gate opening (152), so that the gas flow hole (123) helps increases output of large amount of pressure straightly toward the outside of the valve base (10), thereby achieving a purpose of speeding up stabilization of output of the secondary-side pressure (P2).

Figure 2:
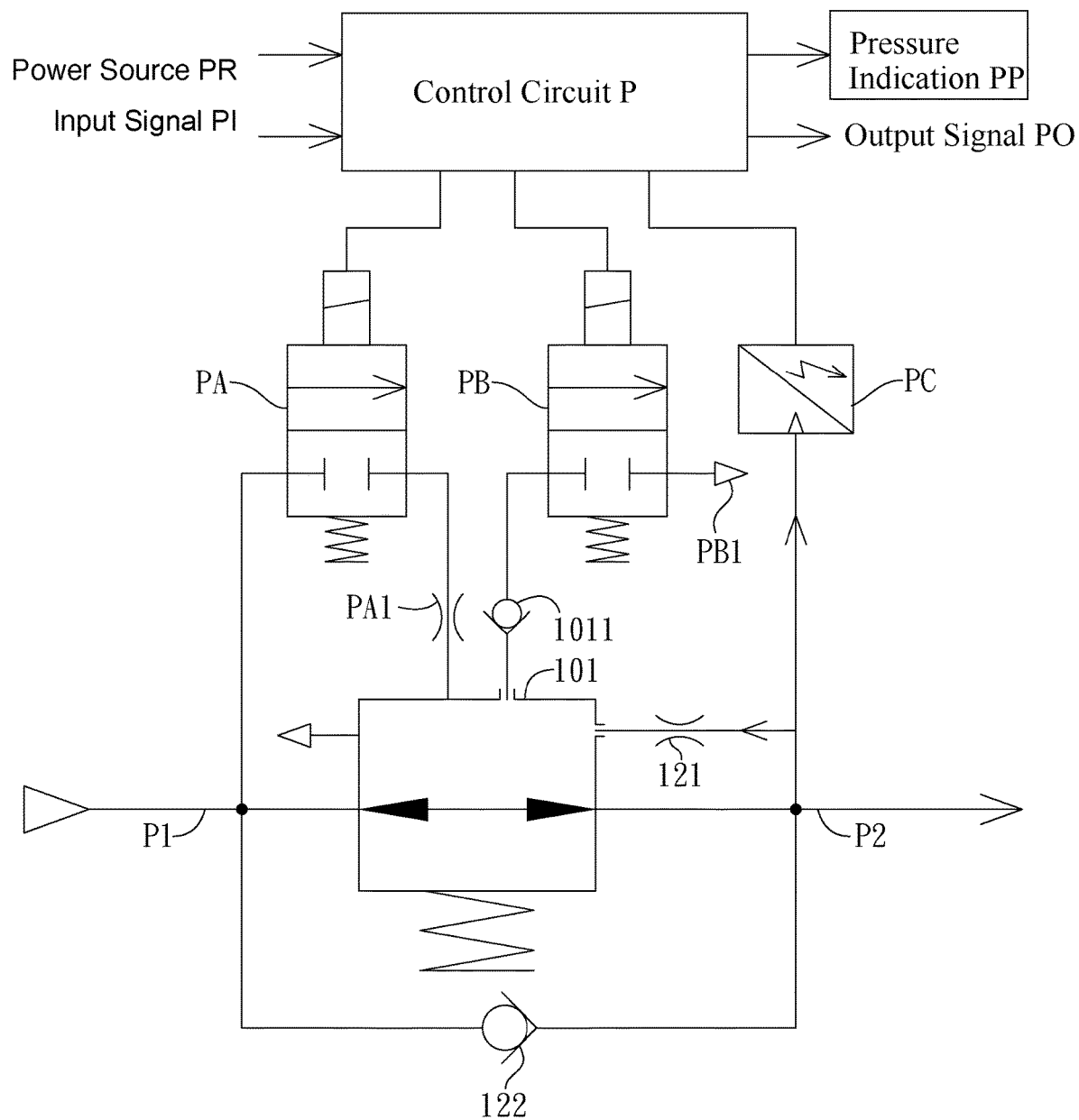
FIG. 2 is a schematic view showing a circuit of the structure of the present invention.

Further, as shown in FIG. 1, it can be seen that the top valve (11) is connected to an ingress electromagnetic valve (PA), an egress electromagnetic valve (PB), and a sensor (PC), and generally, a control circuit (P) is driven by a power source (PR), and an input signal (PI) and an output signal (PO) are set up, and then the control circuit (P) display related pressure indication (PP), so as to drive the ingress electromagnetic valve (PA) and the egress electromagnetic valve (PB), with a path extending from the outlet port (132) to connect the top valve (11) to the control circuit (P) being a sensor channel (113), the sensor (PC) being used to detect the pressure level of the secondary-side pressure (P2), so that information is fed back to the control circuit (P) in case of being greater than or lower than a set level of the secondary-side pressure (P2) to carry out decision between the ingress electromagnetic valve (PA) and the egress electromagnetic valve (PB), wherein when the secondary-side pressure (P2) is excessively high, the egress electromagnetic valve (PB) and the reversal prevention valve (1011) are driven to carry out first stage discharge of the secondary-side pressure (P2), and a large gas opening (PB1) located in the egress electromagnetic valve (PB) is open to raise discharge amount, and when a large amount of discharge is necessary, the top end of the primary shaft (14) completely enters the discharge chamber (124), since the annular area that is a surface area of the discharge chamber (124) minus a surface area of the primary shaft (14) equals to a surface area of the valve gate opening (152), the gas flow hole (123) could help speed up output of a large amount of pressure straightly toward the outside of the valve base (10), this being the second stage discharge; oppositely, if the secondary-side pressure (P2) is excessively low, the ingress electromagnetic valve (PA) is driven to push the main diaphragm (101), so as to have the primary shaft (14) continuously move downward to push and move the secondary shaft (143), to have the secondary-side pressure (P2) continuously increase to a preset level, wherein the related operation can be better understood with reference to a circuit diagram of the entire structure shown in FIG. 2.

Figure 3:
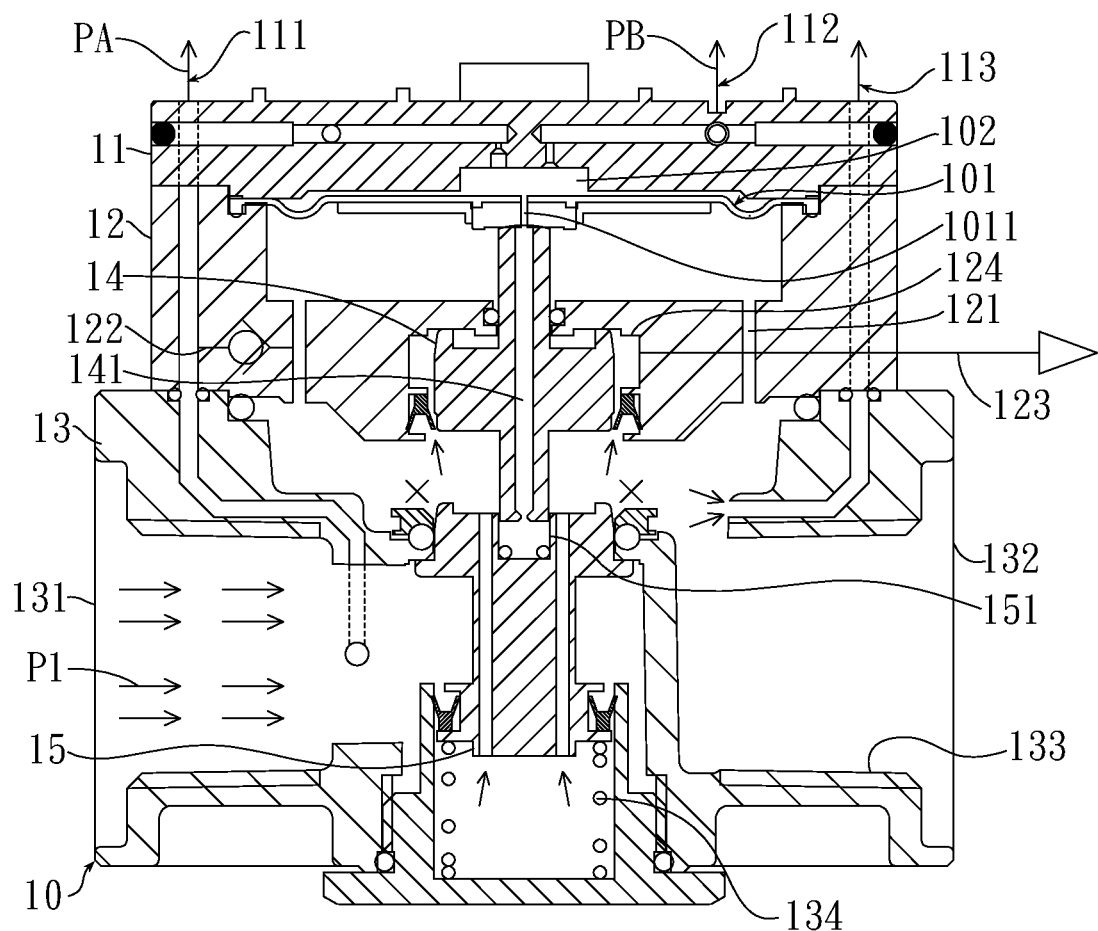
FIG. 3 is a schematic view illustrating an operation in a preparation state of the present invention.

Further reference is made to preparation state shown in FIG. 3, it can be seen the ingress electromagnetic valve (PA) is closed, the egress electromagnetic valve (PB) being open, the primary-side pressure (P1) entering through the inlet port (131), and because of blocking made by the valve gate opening (152) being closed, a part of the primary-side pressure (P1) passes through the guide hole channel (111) and flows to the ingress electromagnetic valve (PA) and is blocked and conducted to flow to the depressurization chamber (102), and under such a condition, the secondary-side pressure (P2) is 0.

Figure 4:
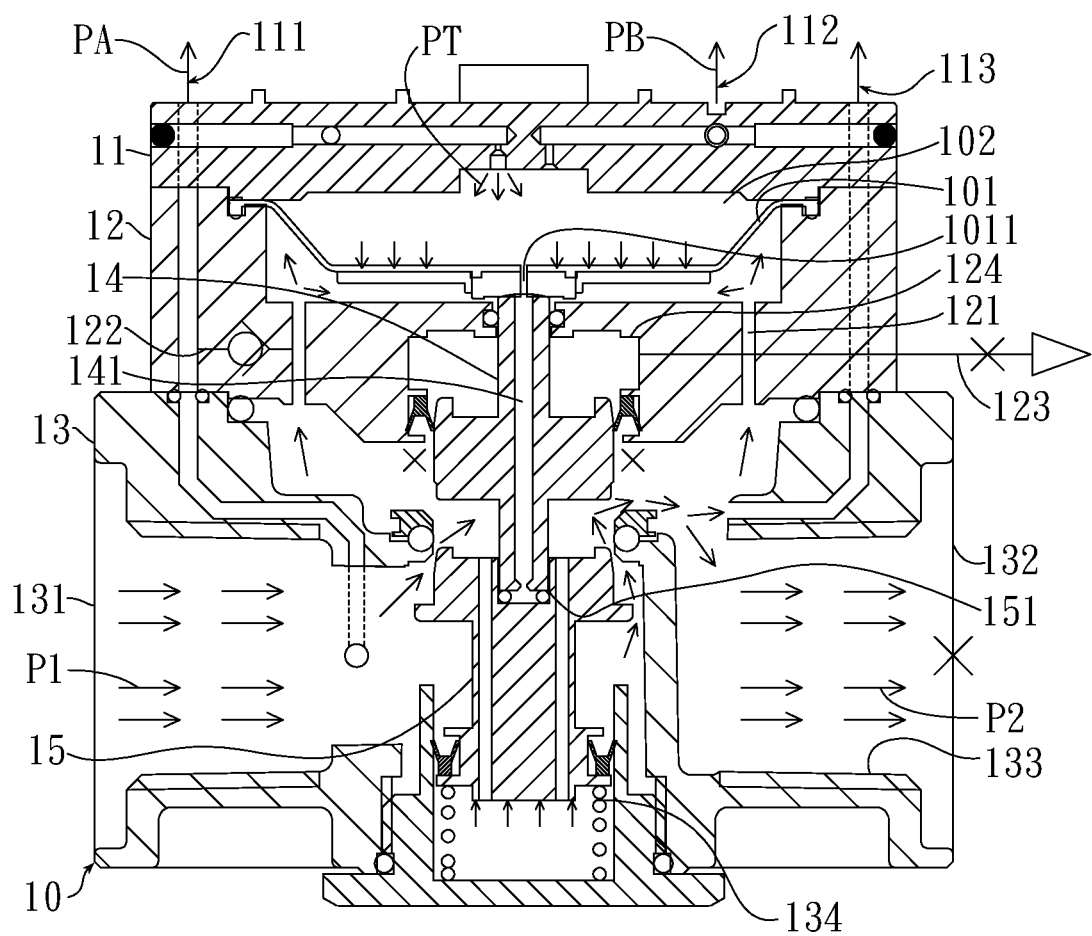
FIG. 4 is a schematic view illustrating an operation in an activation state of the present invention.

Further reference is made to activation state shown in FIG. 4, the ingress electromagnetic valve (PA) is open, the egress electromagnetic valve (PB) being closed, the primary-side pressure (P1) passing through the guide hole channel (111) and via the throttle port (PA1) of the ingress electromagnetic valve (PA) to flow to a location above the main diaphragm (101) inside the depressurization chamber (102) and also forms a balance pressure (PT) to push the main diaphragm (101) downward to the lowermost position and drive the primary shaft (14) in abutting engagement therewith to move downward to further drive the secondary shaft (15) to move, in unison therewith, to go downward thereby opening the valve gate opening (152); the primary-side pressure (P1) passing through the valve gate opening (152) becomes the secondary-side pressure (P2), and flowing toward the outlet port (132), the central valve (12), and the sensor channel (113), and when the sensor (PC) feeds a signal back to the control circuit (P) for reading of the secondary-side pressure (P2) to carry out decision of the ingress electromagnetic valve (PA) and the egress electromagnetic valve (PB), if the secondary-side pressure (P2) is excessively high, an instruction is output to carry out a discharge and depressurization operation with the egress electromagnetic valve (PB); the secondary-side pressure (P2) moves through the flow stabilization hole (121) to flow into the central valve (12), the flow stabilization hole (121) being primarily structured as multiple holes arranged circumferentially and symmetrically with respect to a reference defined by a central axis of the central valve (12) so as to improve stability of displacement or movement of the main diaphragm (101).

This design effectively improves the stability of movement of the main diaphragm (101); and at this moment, the valve gate opening (152) is under a condition that the first stage intake and the second stage intake are simultaneously carried out and this stage is a condition of completely opening the valve gate opening (152).

Figure 5:
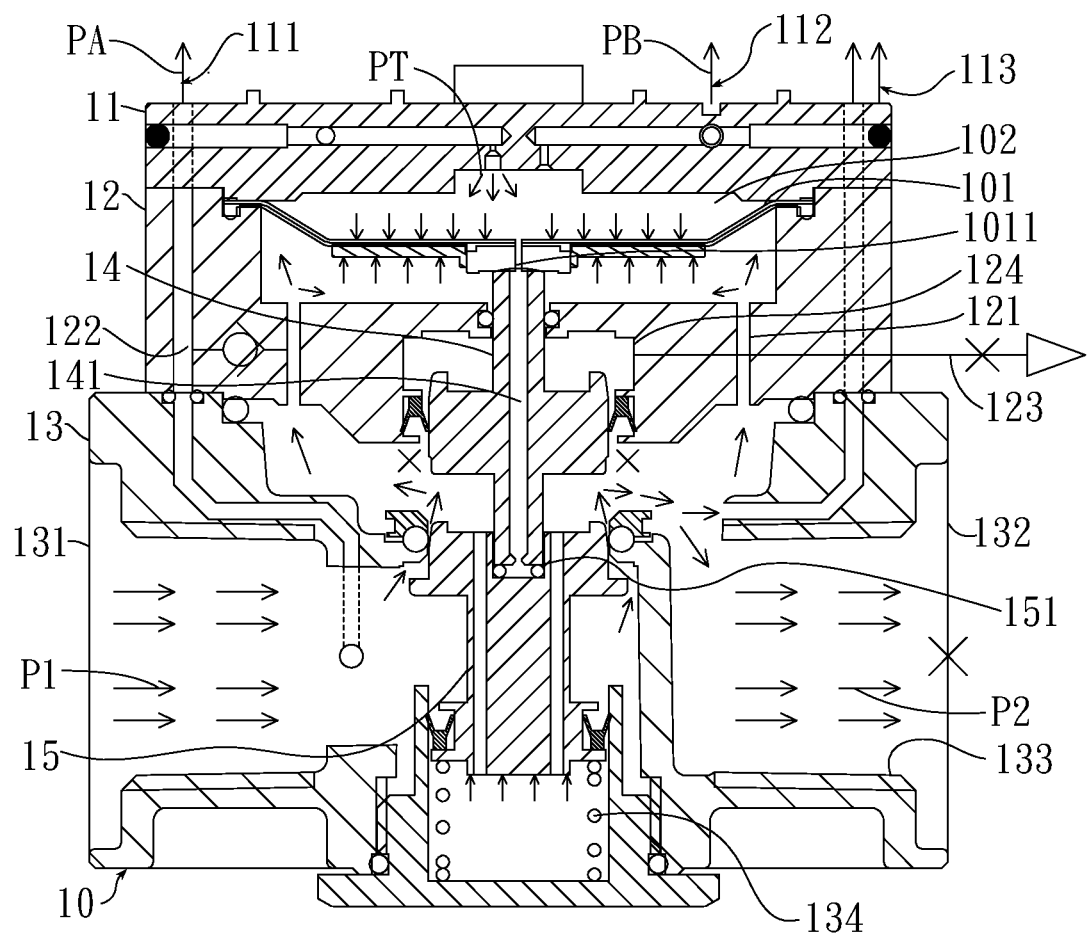
FIG. 5 is a schematic view illustrating an operation of minor pressure increase in an activation state of the present invention.

Further reference is made to the activation state of FIG. 5, the secondary-side pressure (P2) being adjusted for increase, the ingress electromagnetic valve (PA) being closed, the egress electromagnetic valve (PB) being opened, wherein with the egress electromagnetic valve (PB) controlling the fluid flowing into the depressurization chamber (102) and located above the main diaphragm (101), the balance pressure (PT) is reduced, and after balance between the balance pressure (PT) and the secondary-side pressure (P2) located in the depressurization chamber (102) and under the main diaphragm (101), an acting force so generated thereby is acting on the main diaphragm (101) to have the main diaphragm (101) to move upward from the lowermost location of FIG. 4, and the primary shaft (14) and the secondary shaft (15) are also caused by the elastic member (134) to move upward for position restoration. At this moment, the valve gate opening (152) is for the condition of the first stage intake and the primary-side pressure (P1) passes through a gap of the secondary shaft (15) and the valve gate opening (152) to flow toward the outlet port (132), and the secondary-side pressure (P2) does not increase abruptly and the ingress electromagnetic valve (PA) can completely control the time and rate of increase of the secondary-side pressure (P2).

Figure 6:
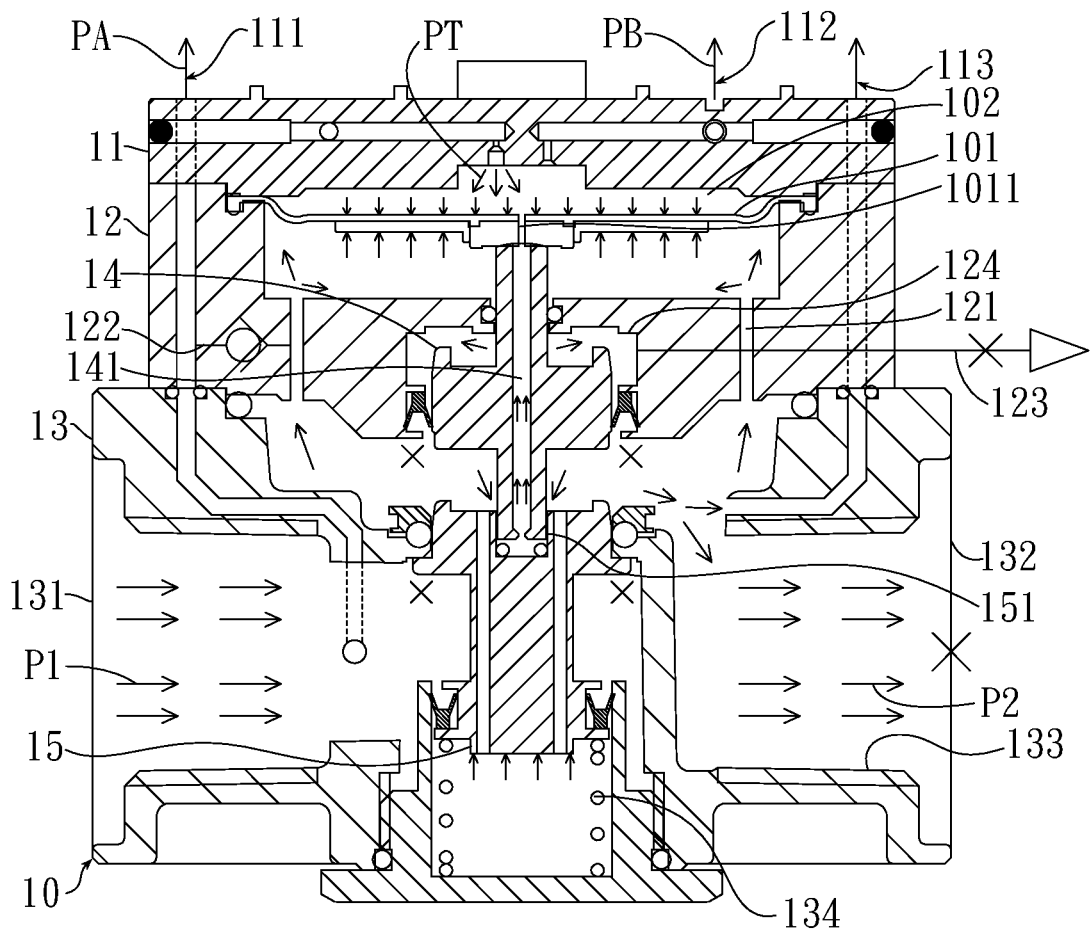
FIG. 6 is a schematic view illustrating an operation of minor pressure decrease in an activation state of the present invention.

Further reference is made to the activation state of FIG. 6, this being adjustment for decreasing pressure, the ingress electromagnetic valve (PA) being closed, the egress electromagnetic valve (PB) being opened, and at this moment, the valve gate opening (152) is in a closed condition so that the primary-side pressure (P1) does not allow to flow through the valve gate opening (152) and the gas passage hole (141) located in the primary shaft (14) also allows the secondary-side pressure (P2) to flow into the depressurization chamber (102), such flow being referred to as the first stage discharge in this invention, wherein by means of the time and rate that the egress electromagnetic valve (PB) discharge fluid, complete control of the time and rate of decreasing of the secondary-side pressure (P2) can be made to achieve a desired target value.

Figure 7:
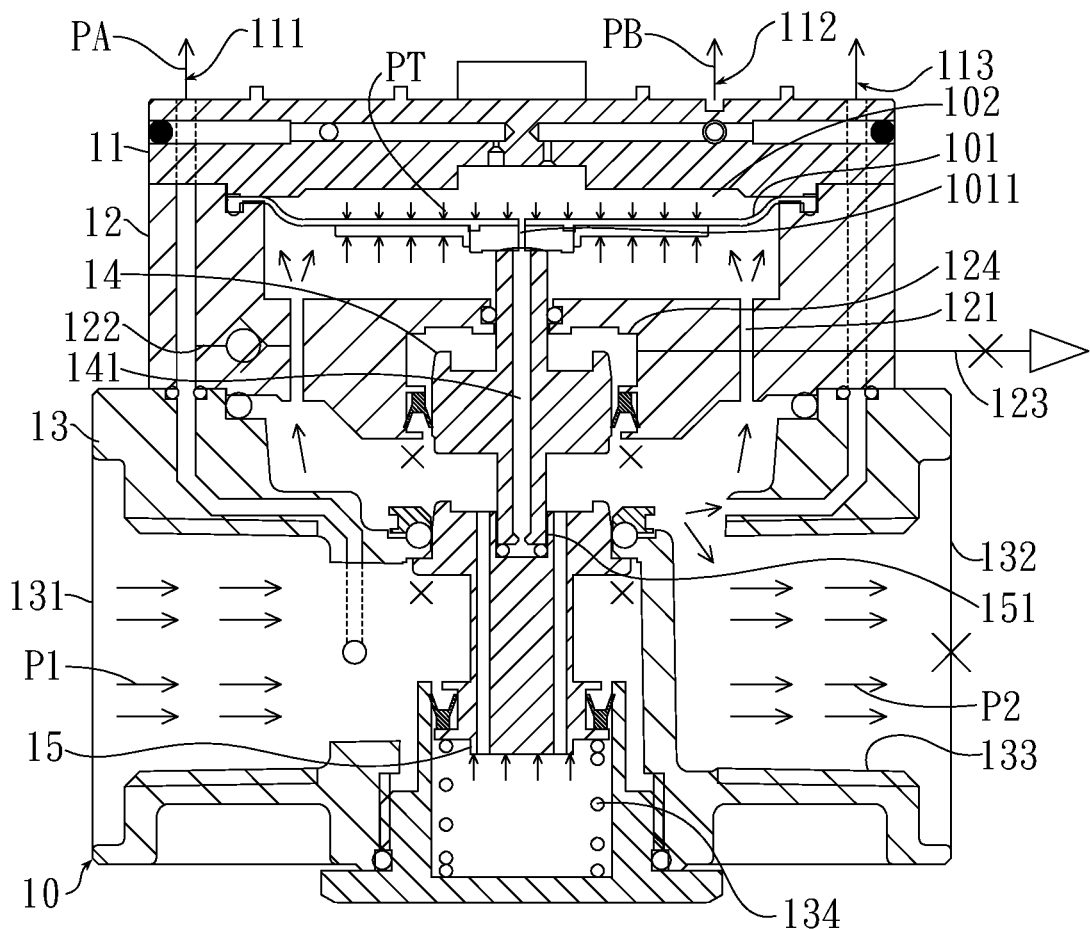
FIG. 7 is a schematic view illustrating an operation in a standby state.

Further reference is made to a standby state of FIG. 7, the ingress electromagnetic valve (PA) being closed, the egress electromagnetic valve (PB) being closed, the valve gate opening (152) being closed, the outlet port (132) under this condition being also closed, so that the secondary-side pressure (P2) is kept in a steady condition.

Figure 8:
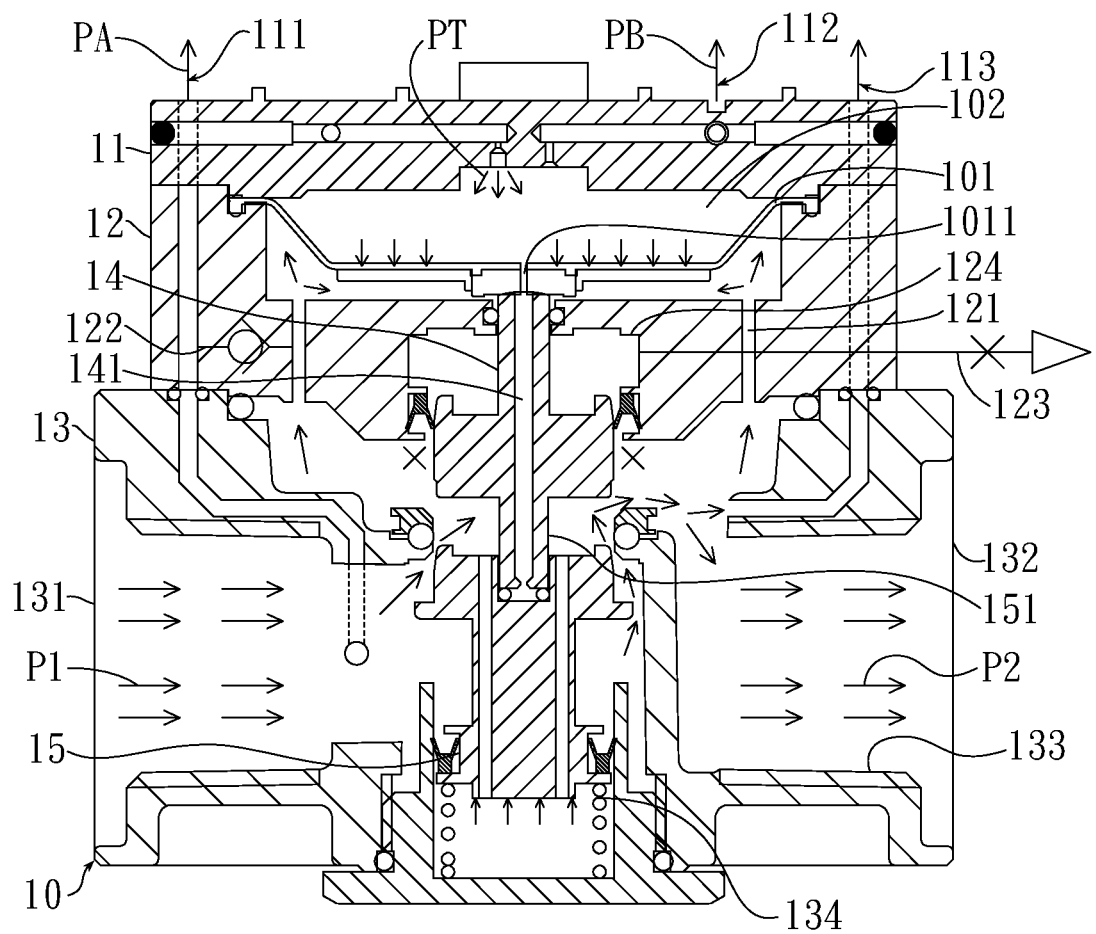
FIG. 8 is a schematic view illustrating an operation in a working state of the present invention.

Further reference is made to a working state of FIG. 8, the ingress electromagnetic valve (PA) being open, the egress electromagnetic valve (PB) being closed, the valve gate opening (152) being completely open for the first and second stage intake, so that the secondary-side pressure (P2) can be output in a large amount through the outlet port (132).

It can be known from the above illustration with reference to FIGS. 3-8, normal output of the secondary-side pressure (P2) is only available in the preparation state and the working state, while in the other states, the secondary-side pressure (P2) is not output by way of the outlet port (132); the gas flow hole (123) provided in the central valve (12) is only opened for the second stage discharge in a condition of the preparation state or a pressure of a reversal flow of fluid in the outlet port (132) is excessively large in order to achieve the purpose of speeding up large amount discharge, and is kept closed in other states; the central valve reversal prevention valve (122) that is also arranged in the central valve (12), for a more detailed description, is arranged between the flow stabilization hole (121) and the guide hole channel (111) for communication therebetween so as to, in a condition that the primary-side pressure (P1) is lower than the secondary-side pressure (P2), the secondary-side pressure (P2) to match, through flowing around, the primary-side pressure (P1), for quickly carrying out depressurization of the secondary-side pressure (P2) and balancing.

In summary, the present invention provides an electrically-controlled large-capacity proportional valve, in which driving the primary shaft (14) and the secondary shaft (15) in a combination of multiple stages provides an adjustment design of the secondary shaft (15) for two stage intake, together with first stage discharge carried out with the gas passage hole (141) also arranged in the primary shaft (14) and second stage discharge carried out with the gas flow hole (123) arranged in the discharge chamber (124), to allow the present invention to achieve the purpose of fast conducting pressure stabilization and accurate pressure regulation for the secondary-side pressure (P2) in a short period of time in the field of large-capacity electrically controlled proportional valves.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An electrically-controlled large-capacity proportional valve, comprising: a valve base, which is formed through connection of a top valve, a central valve, and a valve seat in sequence from top to bottom, the valve base comprising an inlet port for input of a primary-side pressure and an outlet port or output of a secondary-side pressure, connection of the inlet port to the outlet port being achieved with a flow passage, the top valve and the central valve being arranged to sandwich a main diaphragm that comprises a reversal prevention valve to form a depressurization chamber, the top valve be connected to and provided with a guide hole channel that is controlled by an ingress electromagnetic valve to connect to the inlet port, a discharge channel that is controlled by an egress electromagnetic valve to discharge excessive pressure, and a sensor that conducts detection in a sensor channel connected to the outlet port, the central valve being provided therein with a flow stabilization hole connected to the valve seat, a central valve reversal prevention valve connected by the flow stabilization hole to the guide hole channel, and a gas flow hole in communication with the outside, wherein a primary shaft that comprises a gas passage hole is disposed in a discharge chamber of the central valve and a secondary shaft that has an elastic member is disposed under the primary shaft, the main diaphragm abutting the primary shaft for displacement to cause movement of the secondary shaft, which in combination with a spring force of the elastic member, selectively creates a valve gate opening, so that when a pressure of the outlet port is excessively low, the main diaphragm pushes downward the primary shaft and the secondary shaft to carry out two stage intake adjustment, and the egress electromagnetic valve adjusts, by means of the reversal prevention valve of the main diaphragm and the gas passage hole, the secondary-side pressure to carry out control of depressurization through first stage discharge so as to have the valve gate opening achieve accurate adjustment of an output amount of the secondary-side pressure, and in case of necessity for large amount discharge, a top end of the primary shaft completely enters the discharge chamber and since an annular area of a surface area of the discharge chamber minus a surface area of the primary shaft equals to a surface area of the valve gate opening, the gas flow hole is used to speed up output of a large amount of pressure straightly toward the outside of the valve base, this being a second stage large amount discharge depressurization by which a purpose of speeding up stabilization of the output of the secondary-side pressure is achieved.

2. The electrically-controlled large-capacity proportional valve according to claim 1, wherein the secondary shaft further comprises a fitting slot, which is arranged centrally above the secondary shaft, the fitting slot receiving the primary shaft to dispose therein in order to control opening and closing of the gas passage hole.

3. The electrically-controlled large-capacity proportional valve according to claim 1, wherein the flow stabilization hole further comprises a central valve reversal prevention valve, which is arranged at one side of the flow stabilization hole for connecting the flow stabilization hole to the guide hole channel, so as to have the secondary-side pressure quickly follow reduction of the primary-side pressure to achieve a purpose of having the secondary-side pressure to carry out depressurization and balancing.

4. The electrically-controlled large-capacity proportional valve according to claim 1, wherein the flow stabilization hole is structured as multiple holes arranged circumferentially and symmetrically with respect to a reference defined by a central axis of the central valve so as to improve stability of movement of the main diaphragm.

\* \* \* \* \*